(12) United States Patent
McKee et al.

(10) Patent No.: US 11,796,183 B2
(45) Date of Patent: Oct. 24, 2023

(54) SHELF ACTIVATED AIRFLOW CONTROL IN MULTIZONE OVEN

(71) Applicant: Alto-Shaam, Inc., Menomonee Falls, WI (US)

(72) Inventors: Philip McKee, Frisco, TX (US); Jeremy Hogan, Wauwatosa, WI (US); Benjamin Mavis, Kewaskum, WI (US); Lee VanLanen, McKinney, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 480 days.

(21) Appl. No.: 17/038,804

(22) Filed: Sep. 30, 2020

(65) Prior Publication Data
US 2021/0095861 A1  Apr. 1, 2021

Related U.S. Application Data

(60) Provisional application No. 62/908,061, filed on Sep. 30, 2019.

(51) Int. Cl.
*F24C 15/16* (2006.01)
*F24C 15/00* (2006.01)
*A21B 1/26* (2006.01)

(52) U.S. Cl.
CPC .............. *F24C 15/006* (2013.01); *A21B 1/26* (2013.01); *F24C 15/16* (2013.01)

(58) Field of Classification Search
CPC . F25D 25/028; A47F 2003/046; F24C 15/327
See application file for complete search history.

(56) References Cited

U.S. PATENT DOCUMENTS

| | | | | |
|---|---|---|---|---|
| 2,465,555 A | | 3/1949 | Smith | |
| 2,866,399 A | * | 12/1958 | Thompson | F24H 9/0052 165/122 |
| 2,962,875 A | * | 12/1960 | Barroero | F25D 25/028 62/418 |
| 3,115,019 A | * | 12/1963 | Rutishauser | A47F 3/0443 454/193 |
| 3,168,818 A | * | 2/1965 | Weber | A47F 3/0452 62/414 |
| 4,017,133 A | * | 4/1977 | Sigler | A62C 13/78 312/204 |
| 4,852,735 A | * | 8/1989 | Ortlieb | B65D 19/44 206/320 |
| 5,722,252 A | * | 3/1998 | Kang | F25D 17/065 62/417 |
| 6,603,660 B1 | * | 8/2003 | Ehn | H04Q 1/14 361/695 |

(Continued)

FOREIGN PATENT DOCUMENTS

| | | | | |
|---|---|---|---|---|
| EP | 1732359 | | 12/2006 | |
| WO | 0064219 | | 10/2000 | |
| WO | WO-2017031449 A1 | * | 2/2017 | ............. F16K 15/03 |

*Primary Examiner* — Jorge A Pereiro
(74) *Attorney, Agent, or Firm* — Boyle Frederickson S.C.

(57) ABSTRACT

A multi-compartment oven provides removable shelves receiving separated streams of heated air providing heating for different oven cavities above and below the shelves. The shelves communicate with an operator automatically closing ducts providing air to the shelves when the shelves are removed.

12 Claims, 5 Drawing Sheets

(56) References Cited

U.S. PATENT DOCUMENTS

| | | | |
|---|---|---|---|
| 7,137,438 B2* | 11/2006 | Nomura | F25D 25/02 |
| | | | 62/251 |
| 2010/0096038 A1* | 4/2010 | Burris | F16K 23/00 |
| | | | 141/311 A |
| 2010/0193241 A1* | 8/2010 | Bennett | H05K 5/0247 |
| | | | 174/666 |
| 2010/0243315 A1* | 9/2010 | Shumate | H02G 3/085 |
| | | | 174/666 |
| 2012/0062086 A1* | 3/2012 | Garza, Jr. | H05K 5/0217 |
| | | | 312/352 |
| 2012/0222897 A1* | 9/2012 | Bennett | H05K 5/0247 |
| | | | 174/666 |
| 2016/0356504 A1* | 12/2016 | McKee | F24C 15/322 |
| 2016/0356505 A1* | 12/2016 | McKee | F24C 15/007 |
| 2019/0056118 A1 | 2/2019 | McKee et al. | |

\* cited by examiner

SHELF ACTIVATED AIRFLOW CONTROL IN MULTIZONE OVEN

CROSS REFERENCE TO RELATED APPLICATION

This application claims the benefit of U.S. Provisional Application No. 62/908,061, filed Sep. 30, 2019, hereby incorporated by reference

BACKGROUND OF THE INVENTION

The present invention relates to ovens for the preparation of food, and in particular, to a multizone oven providing independent control of the temperature in each zone and allowing removal of shelves to change cooking cavity sizes.

In convection cooking, heated air is circulated rapidly through the cooking compartment to break up insulating, stagnant layers of air around the food, thereby increasing the rate of heat transfer. Higher velocity air typically increases the rate of heat transfer from the air to the food by further disrupting the insulating, stagnant layers of air around the food, as does striking the largest surface of the food with air delivered from a generally perpendicular direction to the food, since perpendicular air is more disruptive to such insulating, stagnant layers of air than air gliding across the largest surface of the food. Improved convection cooking can be obtained by supplying streams of heated air directly to food, for example, through air jets placed in shelves above and below the food being cooked.

Professional kitchens are often called upon to simultaneously prepare a wide variety of dishes requiring cooking for different periods of time at different cooking temperatures and optimally according to a schedule that enables multiple different dishes to emerge from the oven at the same time. U.S. Pat. No. 9,677,774, also assigned to the assignee of the present invention and hereby incorporated by reference, describes a multizone convection oven having shelves with separate passageways communicating with upwardly and downwardly directed air jets. In this way, the shelves can not only deliver streams of heated air directly under and over the food in each zone, but can deliver these heated airstreams at different temperatures and velocities for each zone allowing the cooking of multiple dishes having different temperature requirements with the benefits of localized convection flow.

U.S. Pat. No. 9,879,865 also assigned to the assignee of the present invention describes an improvement in this design allowing the shelves between the different zones to be removed to combine separately controllable zones into a larger cooking cavity for large foods. When a shelf is removed, the air channels feeding heated air to the removed shelf are closed to prevent this heated air from adversely disrupting airflow distribution of the cavity. The closing of these air channels may be performed by a pull knob at the front of the oven or by electromechanical actuators.

SUMMARY OF THE INVENTION

The present invention provides a multizone oven allowing for the removal of a shelf without complex electromechanical mechanisms for closing the air channels feeding the shelf or the need for the user to remember to close these air channels manually. The design allows insertion of the shelf to automatically open a shutter providing air to the shelf and removal of the shelf to automatically close that shutter preventing disruption of the heating pattern. In this way, airflow is properly controlled without the risk of the user forgetting to open or close the shutters or the need for complex electromechanical operators.

Specifically then, in one embodiment, the invention provides a multi-cavity oven having a housing with inner walls defining an oven cavity. At least one removable shelf fits within the oven cavity and provides an upper and lower passageway through the removable shelf communicating respectively with upwardly directed and downwardly directed air jets of the removable shelf, the shelf separating the oven cavity into an upper and lower cooking chamber. First and second air outlets through an inner wall of the oven cavity communicate with the upper and lower passageways of the removable shelf respectively when the removable shelf is installed within the oven cavity, and first and second shutters are positioned at the first and second air outlets respectively to be movable between an opened state allowing air passage out a respective one of the first and second outlets and a closed state blocking air passage out of the respective one of the first and second outlets. At least one operator communicates between the removable shelf and the first and second shutters to move the first and second shutters between the closed state and opened state with insertion of the removable shelf into the oven cavity.

It is thus a feature of at least one embodiment of the invention to provide an improved mechanism for ensuring that undesirable heated air does not flow onto the food directly when the shelf is removed.

The first and second shutters may each provide a flap hingeably attached over the first or second air outlets respectively to swing inward away from the oven cavity and into the first or second air outlets in the opened state and to swing outward toward the oven cavity to block the first and second air outlets in the closed state.

It is thus a feature of at least one embodiment of the invention to provide a shutter mechanism that is resistant to binding at high temperatures or with contamination.

The flaps may extend downwardly from sleeves having horizontal bores receiving hinge pins allowing the sleeves to swing about horizontal axes of the hinge pins.

It is thus a feature of at least one embodiment of the invention to provide simple and reliable gravity assisted movement of the flaps.

At least one stop surface may be provided to prevent a swinging outward of the first and second flaps into the oven cavity from the closed state.

It is thus a feature of at least one embodiment of the invention to further enlist air pressure of the oven air for closure of the flaps, stopping the air flaps at the closed state.

The operator may be a rearwardly extending finger attached to a rear edge of a removable shelf so that this operator presses at least one of the first and second shutters inward.

It is thus a feature of at least one embodiment of the invention to provide a simple operator mechanism operating directly on the shutters without complex linkages or the like subject to binding.

A shutter may include a tooth extending outwardly from a surface facing the finger to engage the finger.

It is thus a feature of at least one embodiment of the invention to facilitate movement by the shutters of greater than 90° for improved airflow in the opened state.

The removable shelf may provide a separable upper and lower shelf portion providing the upper passageway or lower passageway respectively where each of the shelf portions provides a finger pressing a respective one of the first and second shutters inward.

It is thus a feature of at least one embodiment of the invention to allow tailoring of the operator for different shutter movement of the first and second shutters.

Each finger may provide a first portion closest to the holes of the shelf portion and respectively extending rearward further than a second portion of the finger further from the holes of the shelf portion so that the upper shelf portion having upwardly facing holes provides a greater angular swing in the shutter than the lower shelf portion having downwardly facing holes.

It is thus a feature of at least one embodiment of the invention to provide a single finger design that can work with upper or lower shelf portions.

The first and second air outlets may communicate with ductwork behind the inner wall away from the oven cavity connected with independent heating elements and the ductwork may include pockets for receiving the first and second shutters flush with a duct wall when the first and second shutters are in the opened state.

It is thus a feature of at least one embodiment of the invention to minimize airflow resistance from the shutter mechanism.

An inner wall of the housing adjacent to a shutter may provide an access area bounded by perforations, the wall of the access area selectively removable by prying action-breaking material between the perforations to remove material of the access area to provide access to the shutter.

It is thus a feature of at least one embodiment of the invention to provide occasional access to the shutters without the burden of removable access panels for each shutter.

The inner wall may further include pilot holes outside of the access area for receiving and attaching a patch plate sized to cover the access area once the material of the access area has been removed.

It is thus a feature of at least one embodiment of the invention to allow a reduced number of patch plates to be used for occasional repairs of selected shutters.

The housing may provide outer walls spaced from and outside of the inner walls and the outer wall may also provide an access area bounded by perforations, the wall of the access area of the outer wall selectively removable by prying action-breaking material between the perforations to remove material of the access area of the outer wall to provide access to the access area of the inner wall.

It is thus a feature of at least one embodiment of the invention to provide cost efficient access to the shutters through multiple walls of a typical oven.

As noted, the passageway through the shelf that conducts air from an outlet in the wall of the oven cavity through air jets covering the surface of the shelf may provide a curved baffle plate that reduces the cross-sectional area of this cavity as one moves away from the oven wall outlet to improve airflow uniformity. Such a baffle plate must hold a precise curvature, for example, as insured by rivets or the like attaching the baffle plate to the shelf. As so attached, however, the close passageway of the shelf can be difficult to clean, for example, when food materials fall through the air jets into the shelf cavity.

In one embodiment, the present invention provides an easily removed baffle plate, having on opposite edges, upwardly and downwardly extending tabs which cooperate with channels on the shelf to bend the baffle plate into the proper form as it is inserted into the channel. The points of contact between the baffle plate and the shelf are reduced to small areas minimizing adhesion between the surfaces by food and debris.

Specifically, in one embodiment, the invention provides a multi-cavity oven having a housing with inner walls defining an oven cavity. At least one removable shelf fits within the oven cavity and provides a horizontally extending passageway through the removable shelf communicating with air jets directed outwardly along one horizontal surface of the removable shelf. An air outlet through an inner wall of the oven cavity communicates with the horizontally extending passageway through the removable shelf when the removable shelf is positioned within the oven cavity, and a removable baffle plate fits within the removable shelf to define one side of the horizontally extending passageway. The baffle plate, when fit within the removable shelf, has a curve to provide a reduced cross-sectional area of the horizontally extending passageway as one moves away from the air outlet to provide more uniform airflow through the air jets.

The removable shelf may provide horizontally extending channels for receiving the opposed edges of the removable baffle plate. The horizontally extending channels may be opposed C-channels opening toward each other.

It is thus an object of at least one embodiment of the invention to provide a baffle plate that can hold precise curvature while remaining easily removable.

The baffle plates may provide a substantially planar rectangular sheet. The baffle plates may include tabs extending upwardly and downwardly at the edges of the baffle plate to bend the baffle plate into the curve as the tabs are inserted into the channels.

It is another object of the invention to provide a readily manufactured baffle plate having a precise curvature which can be defined by the tab outlines rather than complex forming steps and supporting frameworks.

A vertical extension of the tabs may change as a function of position toward a front or rear of the baffle plates.

It is another object of the invention to define the precise curvature of the baffle plates to improve the uniformity of airflow through the removable shelf.

The tabs may have vertical slots.

It is another object of the invention to allow for bending action of the baffle plates without the tabs cracking.

A front edge of the baffle plates may include upwardly extending bosses minimizing a contact area between the front edge of the baffle plates and the removeable shelf.

It is another object of the invention to permit easy removal of the baffle from the removable shelf by separating the baffle from the removeable shelf surface at ends where there may be no tabs.

In one embodiment of the invention, double doors may be provided on the front of the oven to provide improved oven cavity access in spaces where a single swinging door would be unwieldy. A compact linkage and slider mechanism coordinates opening and closing of the double doors using a handle on one of the doors while offsetting the closure of the doors for improved door locking, gasketing, and reduced gap between the doors when they are closed.

More specifically, one embodiment of the invention may provide a multi-cavity oven having a housing with inner walls defining an oven cavity accessible through an oven opening and providing a left and right oven door for access to the oven cavity. The left and right doors may hinge about vertical hinge axes on opposite sides of the oven opening to provide opposing doorframe edges moving into close proximity when the left and right doors are in a closed position and moving away from each other when the left and right doors are in an opened position. A door linkage joins the left and right doors to move both the left and right doors between the opened and closed state with the movement of either of the left and right doors such that the left door reaches a closed position before the right door during a closing of the left and right doors.

It is thus a feature of at least one embodiment of the invention to provide improved operation of double doors on an oven.

These particular objects and advantages may apply to only some embodiments falling within the claims and thus do not define the scope of the invention.

DETAILED DESCRIPTION OF THE PREFERRED EMBODIMENT

Figure 1:
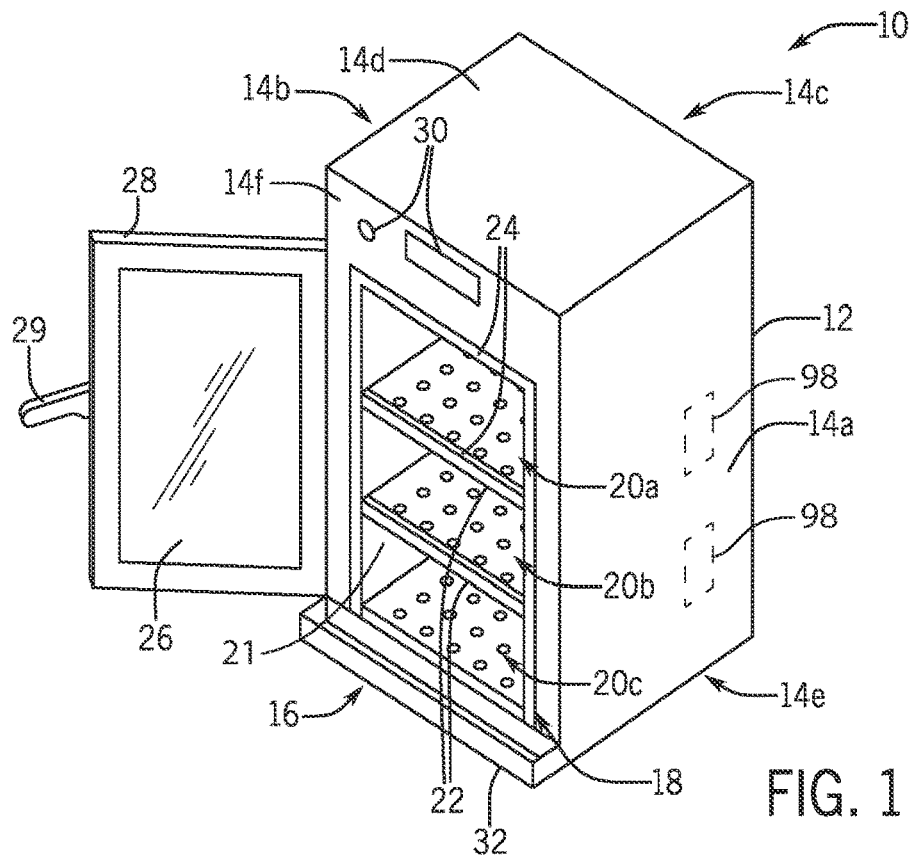
FIG. 1 is a simplified, perspective view of an oven constructed according to one embodiment of the present invention showing a cooking volume divided into cooking cavities by removable shelf assemblies.

Referring now to FIG. 1, a multizone oven 10 may provide for a housing 12 having upstanding right and left outer side walls 14a and 14b and upstanding rear wall 14c extending therebetween. These three walls 14 join generally opposed upper and lower walls 14d and 14e, the latter providing support so that the oven 10 may rest on a cart or the like (not shown).

The walls 14 enclose a generally rectangular cooking volume 16 having an opening 18 through a front wall 14f to provide access to the cooking volume 16 receiving food for cooking. The cooking volume 16 is defined by inner walls 19 spaced inwardly from each of the outer walls 14. The cooking volume 16 may be subdivided into cooking cavities 20a, 20b, and 20c (for example) from top to bottom, by means of shelf assemblies 22 as will be described in more detail below.

The perimeter of the oven opening 18 and a front edge of each shelf assembly 22 support an elastomeric gasket 24 that may seal against an inner surface of a glass panel 26 providing an inner surface of a door 28. The door 28 hinges about a vertical axis at the front edge of wall 14b to move between open and closed states, the latter sealing the cavities 20a-c with respect to the outside air and with respect to each other. The door 28 may be held in the closed state by a latch mechanism and handle 29 as is generally understood in the art. In one embodiment the glass panel 26 of the door 28 extends as a continuous surface over the openings of each of the cavities 20; however, the invention also contemplates separate glass panels or separate doors associated with each of the cavities 20.

An upper portion of the front wall 14f may support user controls 30 including input control such as one or more dials and an output display such as an LCD display for communicating with the user. A condensation tray 32 may extend forward from a lower edge of the front wall 14f to catch condensation from the inner surface of the glass panel 26 when the door 28 is being opened or closed.

Figure 2:
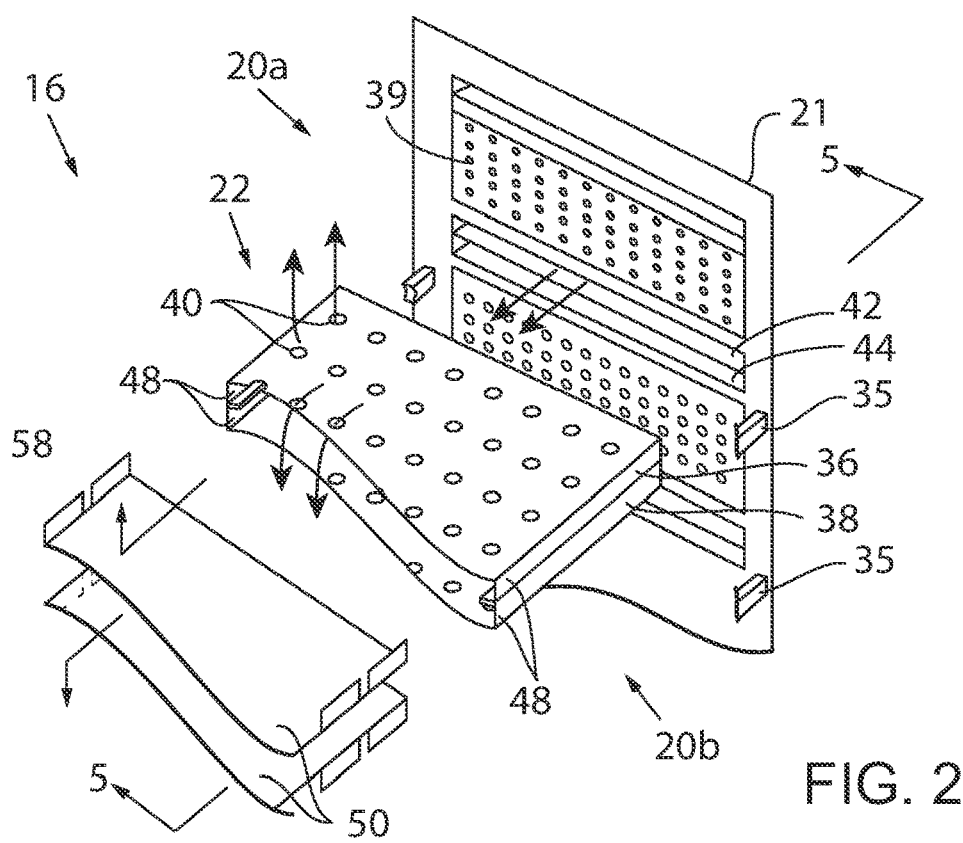
FIG. 2 is an exploded diagram of a removable shelf assembly showing upper and lower shelf units which receive separate airstreams through openings in the back wall of the oven and baffle plates that are received within the shelf units to segregate the airflows and to provide more even airflow.

Referring now to FIG. 2, each shelf assembly 22 may include an upper shelf unit 36 and the lower shelf unit 38 being generally mirror images of each other and separately removable as supported on guide rails 35 attached to the inner walls 19 of the cooking volume 16. Each of the shelf units 36 and 38 may have a set of outwardly exposed jet ports 40 (on the upper horizontal surface of shelf unit 36 or lower horizontal surfaces of shelf unit 38). These jet ports 40 provide heated cooking to an upper cavity 20a (with respect to the jet ports 40 on shelf unit 36) or a lower cavity 20b (with respect to the jet ports 40 on shelf unit 38).

The heated air for the jet ports 40 on each shelf unit 36 and 38 is received from an internal channel in the respective shelf unit 36 and 38 (to be described below) which in turn is sourced from separate air discharge apertures 42 and 44 in a rear inner wall 21 in the cooking volume 16. More specifically, air from air discharge aperture 42 passes through the shelf unit 36 and air from air discharge aperture 44 passes through the shelf unit 38. Return air passing out through the jet ports 40 of the shelf units 36 and 38 may be received by air vents 39 in the rear inner wall 21 in the cooking volume 16, located between the air discharge apertures 42 and 44. The air vents 39 may span substantially a horizontal width of the air discharge apertures 42 and 44 and substantially a vertical height between the air discharge apertures 42 and 44.

The air provided from these separate air discharge apertures 42 and 44 may have separate temperature control, for example, as described in U.S. patent applications: publication Nos. 2017/0211819; 2018/0031250; and 2018/0142900 all assigned to the assignee of the present application hereby incorporated by reference in their entirety. As depicted, shelf units 36 and 38 represent only one example shelf assembly 22 and this general construction is repeated for other cavities 20 as appropriate.

Referring still to FIG. 2, each of shelf units 36 and 38 provides horizontally opposed side channels 48 C-channels opening toward each other and extending along front to back on the right and left edge of the shelf units 36 and 38). The side channels 48 receive corresponding baffle plates 50 that serve to segregate the airflows within each of the shelf units 36 and 38 from each other. The inner surfaces of the shelf units 36 and 38 are otherwise open so that, but for the baffle plates 50, the air would flow in a shared cavity of the shelf units 36 and 38.

Figure 3:
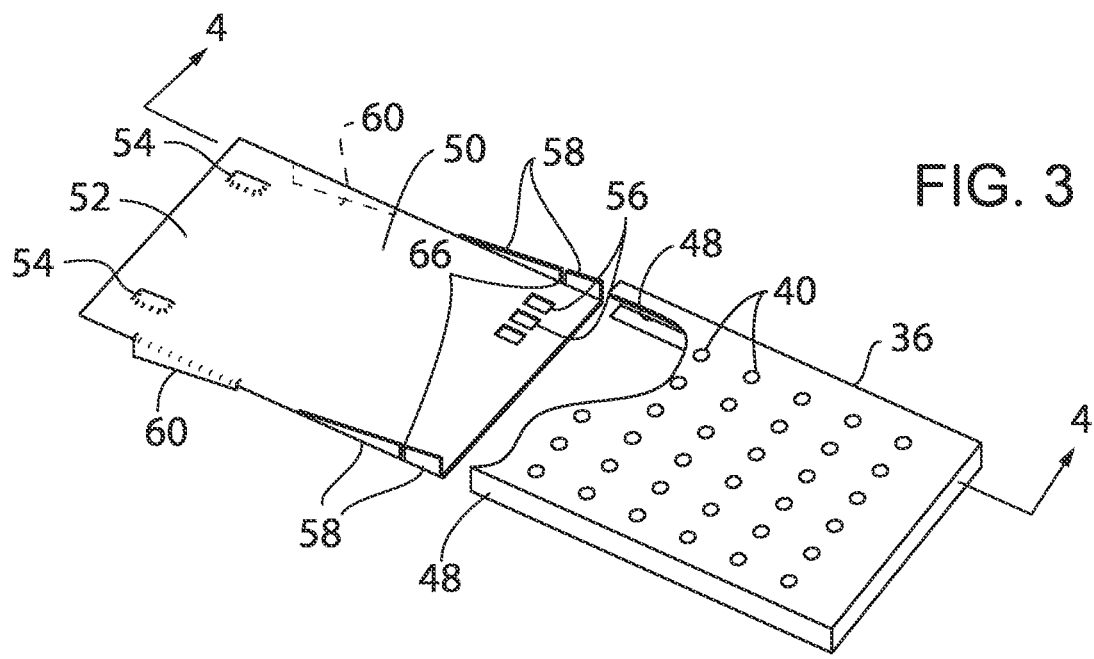
FIG. 3 is an exploded view of the upper shelf unit of the removable shelf assembly positioned for receipt of a baffle plate in an unflexed planar configuration.

Referring now to FIG. 3, the baffle plates 50 in a relaxed state provide a substantially planar rectangular sheet 52 of constructive material, that in at least one embodiment is represented by stainless steel. A front edge of the sheet 52 may have upwardly extending bosses 54, for example, having a height of approximately ⅛ inch embossed in the metal of the sheet 52. A rear of the sheet 52 may have one or more welded upstanding vanes 56 which serve to control the air distribution to provide for more flow of air from left to right across the surface of the baffle plate 50 during use.

The left and right edges of the baffle plate 50 toward the rear of the baffle plate 50 provide for tabs 58 extending vertically upward from a plane of the baffle plate 50. Likewise, toward the rear of the baffle plate 50, the left and right edges of the baffle plate 50 provide downwardly vertically extending tabs 60. The vertical extension of these tabs 58 and 60 from a plane of the baffle plate 50 changes as a function of position toward the front or rear of the baffle plate 50 to define the curvature of the baffle plate 50 as it is inserted into the side channels 48.

Figure 4:
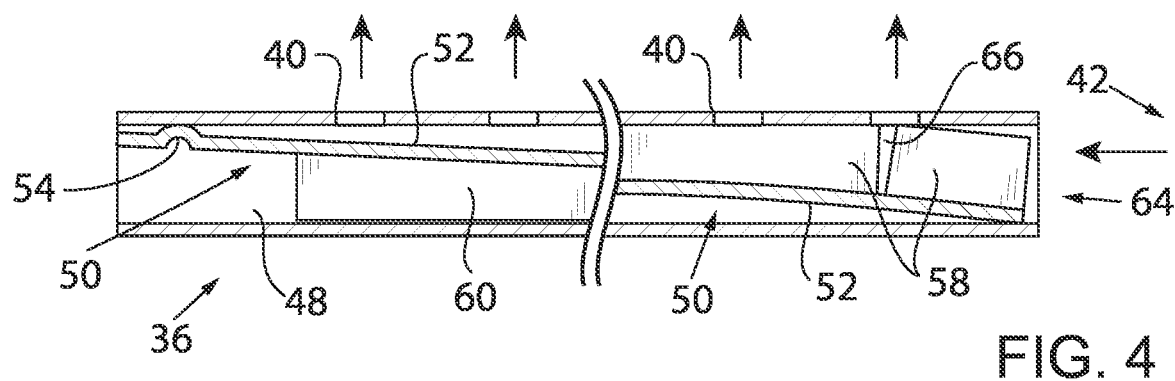
FIG. 4 is a cross-sectional view along line 4-4 of FIG. 3 showing the forming of the baffle plate into the proper curvature by upwardly and downwardly extending tabs on the baffle plate as the baffle plate is installed.

When the baffle plate 50 is inserted between the side channels 48 of a respective shelf unit 36, the vertically extreme edges of the tabs 58 and 60 engage the horizontally extending legs of the channels 48 to bend the baffle plate 50 according to the vertical extent of the tabs 58 and 60. Referring to FIG. 4, in this regard, the upper edge of the forward tabs 58 press against the lower inner surface of the upper horizontally extending leg of the channel 48 pressing the sheet 52 downward to provide a maximum opening aperture 64 toward the rear of the unit 36. The lower edge of the rearward tabs 60, conversely, press against the upper inner surface of the lower horizontally extending leg of the channel 48 pressing the sheet 52 upward to reduce the cross-sectional area of the air passage above the sheet 52 as one moves toward the front of the shelf unit 36. The frontmost edge of sheet 52 presses against the inner side of the upper surface of the shelf unit 36 closest to the jet port 40 riding on the upwardly extending surfaces of the bosses 54. The relatively small contact areas between the inner surfaces of the shelf unit 36 and the tabs 58 and 60 and bosses 54 allow easy removal of the baffle plate 50 for cleaning or the like. The tabs 58 (and 60) may have vertical slots 66 to allow the desired bending action and may be spaced inwardly from the vertical inner surfaces of the channels 48 to prevent adhesion between these broad surfaces. The baffle plate 50 for the shelf unit 38 is generally identical, however, installed in an inverted manner in the mirror image of inverted shelf unit 38.

It is understood that in at least one embodiment, the shelf units 36 and 38, shown in FIG. 2, are interchangeable and can substitute as lower and upper positioned shelf units, respectively, by inverting the shelf units 36 and 38. In this respect, manufacturing of the shelf units 36 and 38 is simplified.

Figure 5:
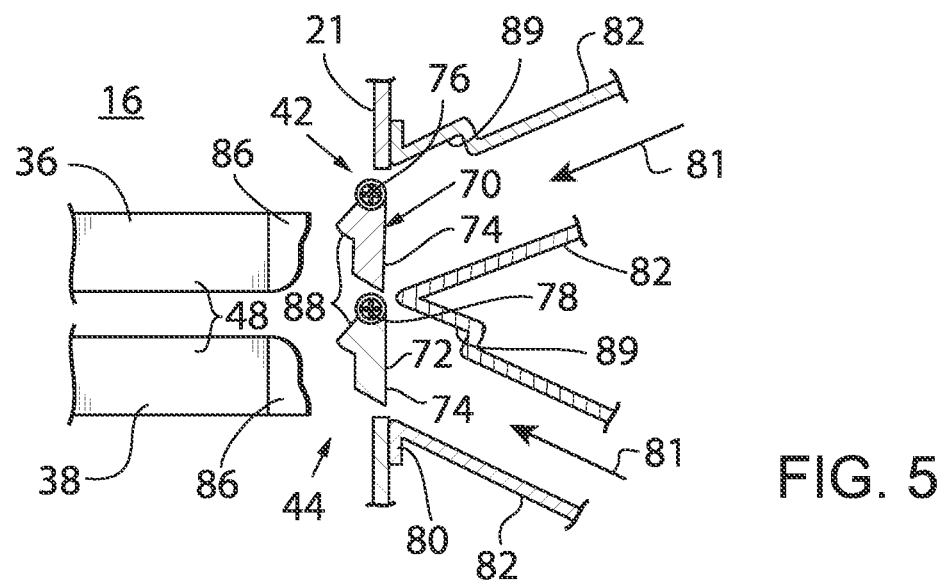
FIG. 5 is a cross-sectional view along line 5-5 of FIG. 2 showing a gravity-actuated shutter closing the openings in the back wall of the oven prior to shelf insertion.

Referring now to FIGS. 2 and 5, the air discharge apertures 42 and 44 in the rear inner wall 21 of the cooking volume 16, providing heated air to the shelf units 36 and 38, support shutters 70 and 72, respectively, each providing a gravity-actuated door flap 74 that may swing like a pendant under the force of gravity about a pivot axis 76 or 78, respectively, positioned at the upper edges of air discharge apertures 42 and 44 respectively. In a first closed state, the door flaps 74 are substantially vertical and block the air discharge apertures 42 and 44. Further clockwise motion of the door flaps 74 from the vertical configuration shown in FIG. 5 is prevented by interference between the lower edges of the door flaps 74 and, for example, the structure of the ducting 80 conducting air to the air discharge apertures 42 and 44 or by contact with the other of the door flaps 74 as depicted, each providing stop surfaces. In the closed state, normal airflow out of the air discharge apertures 42 and 44 indicated by arrows 81 is blocked, and air pressure from airflow indicated by arrows 81 and gravity serve to bias the door flaps 74 to this closed state.

Figure 6:
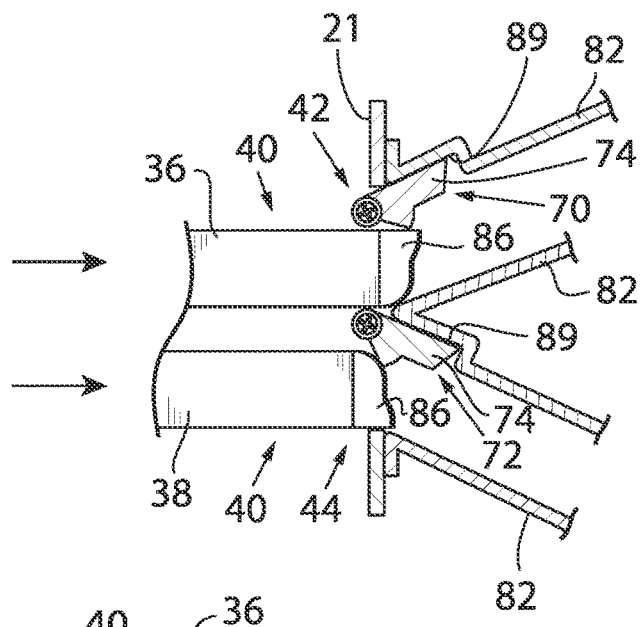
FIG. 6 is a figure similar to that of FIG. 5 showing insertion of the shelves which opens the associated shutters.
Figure 7:
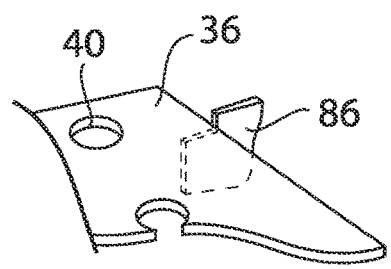
FIG. 7 is a fragmentary perspective view of a rear facing tab on the shelves which engages the shutters to open the shutters.

Referring now also to FIGS. 6 and 7, a rear edge of each of the shelf units 36 and 38 may have a rearwardly extending finger 86. This finger 86 cooperates with a corresponding tooth 88 on a front side of each door flap 74 to fully open the door flap 74 when the corresponding shelf unit 36 and 38 is fully installed in the oven rearwardly as positioned against a stopping surface of the rear inner wall 21.

The amount of desired angular swing in the opening of each of the door flaps 74 is different for the shutters 70 and 72 because of the angulation of the ducts 82 leading to the particular air discharge apertures 42 and 44. Accordingly, the fingers 86 provide for a greater rearward extension on the side of the shelf unit 36 or 38 having the jet ports 40 and a lesser rearward extension on the opposite side of the finger 86 to accommodate this difference. In this way the door flap 74 of the shutter 70 provides for a greater angular opening motion to conform with the upwardly diverging duct 82 associated with the air discharge aperture 42. Conversely, door flap 74 of shutter 72 provides for lesser angular opening motion to conform with the downwardly diverging duct 82 associated with the air discharge aperture 44. Conversely, this difference may be provided by changes in the forward extension of 88. When open, door flaps 74 may fit within corresponding pockets 89 in the ducting substantially flush with adjacent duct walls so as to minimize disruption of the airflow when fully open.

Figure 8:
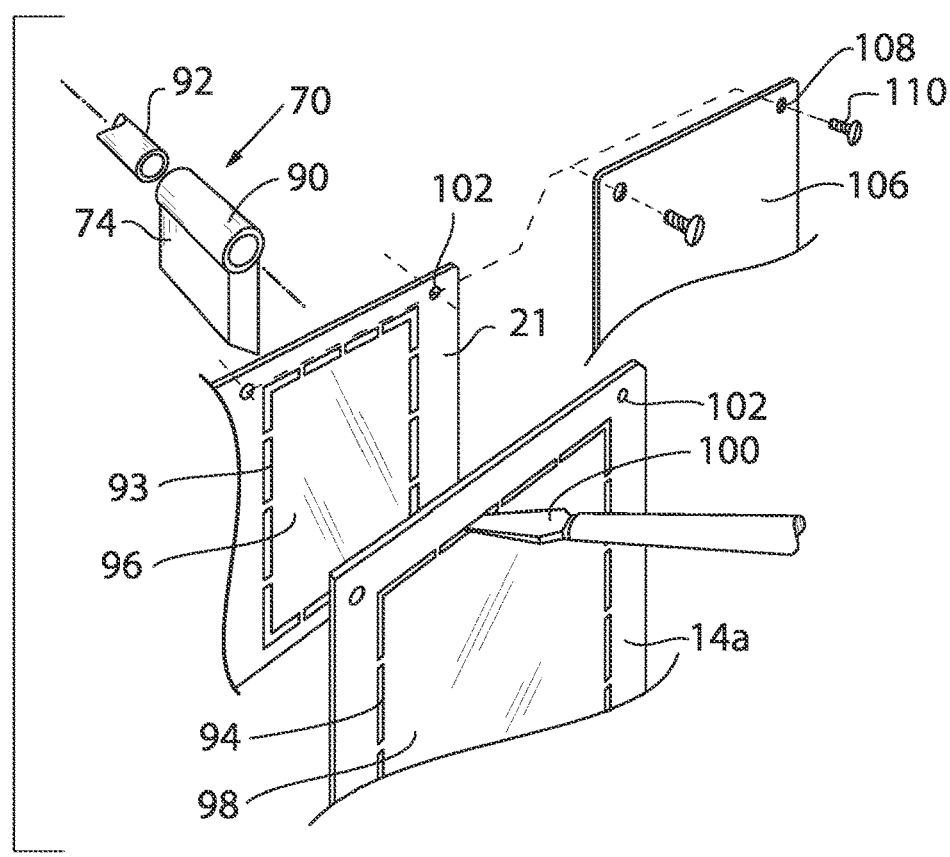
FIG. 8 is an exploded fragmentary view of the oven walls positioned between the shutters of FIGS. 5-6 and an outside of the oven and showing breakaway panels for ready access to the shutters as may be required.

Referring now to FIGS. 1 and 8, generally the door flaps 74 may have an upper sleeve 90 providing a horizontal bore receiving a horizontally extending hinge pin 92 so that the sleeve 90 may rotate about the hinge pin 92 (protecting the latter against contamination) to provide for the necessary angular movement of the door flaps 74. Occasionally, it may be necessary to have access to the shutters 70 and 72 through the outer side wall 14 and inwardly spaced inner side wall 21 of the oven, for example, to free the shutters 70 and 72 from obstructing food splatter or the like that cannot be easily accessed from within the cooking volume 16. Accordingly, the inner wall 21 and adjacent outer wall 14a may include access areas 96 and 98 surrounded by perforations 93 and 94, respectively. The material of these access areas 96 and 98, can be broken free, for example, by insertion of a screwdriver tip 100 or the like into perforations 93 and 94 and prying the material of the access areas 98 or 96 outwardly to break the tabs remaining between the perforations 93 and 94. Ideally these perforations are implemented through a laser cutting process providing narrow retention tabs between slot-like perforations, for example, the tabs having a width less than the thickness of the material of the walls 14a or 19 and, for example, less than 0.05 inches.

Pilot holes 102 may be cut at four corners outside the perforation 93 and 94 to allow a repair panel 106 having corresponding aligned pilot holes 108 to be installed with self tapping machine screws 110 over the openings left by the removal of the material from the access areas 96 and 98 after completion of any necessary repair of the shutters 70 and 72. This approach provides access to multiple locations at a low incremental cost in proportion to likely rarity of a need to repair the shutters 70 and 72 in this manner. The perforation 93 and the pilot holes 102 have sufficiently small size as to not materially affect airflow or heat loss out of the cooking volume 16 because of high turbulence in these narrow channels and their small area.

Figure 9:
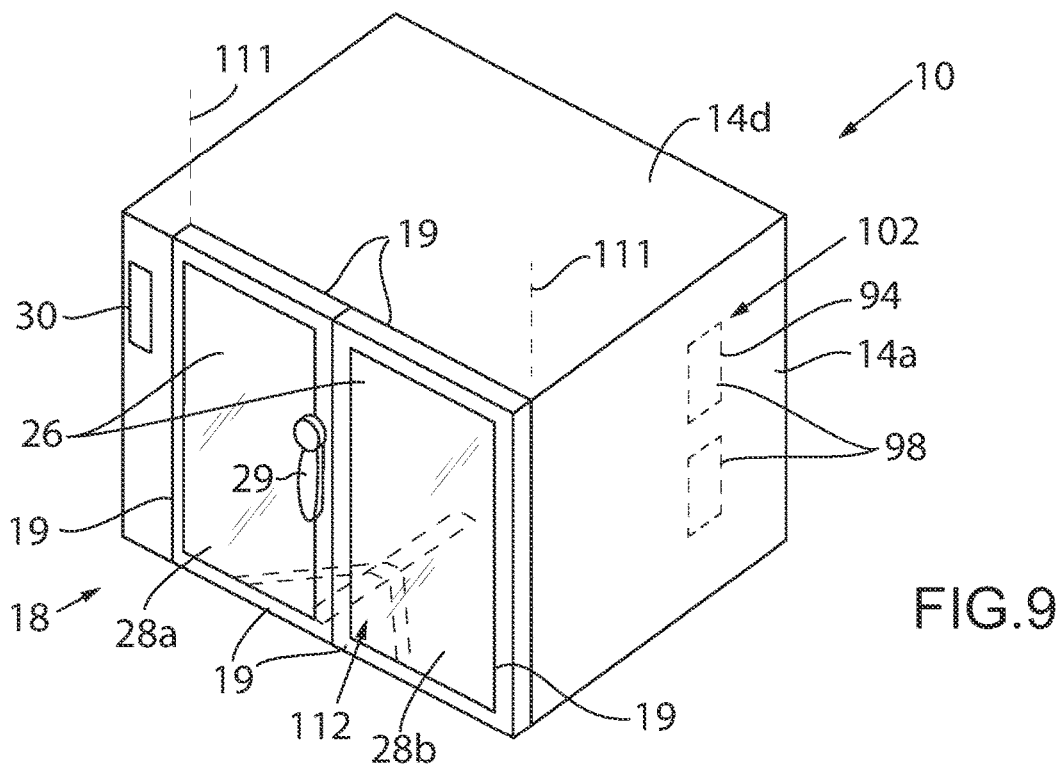
FIG. 9 is a perspective view of an oven similar to that of FIG. 1 showing double doors in a closed configuration and showing a door opening mechanism in phantom.
Figure 10:
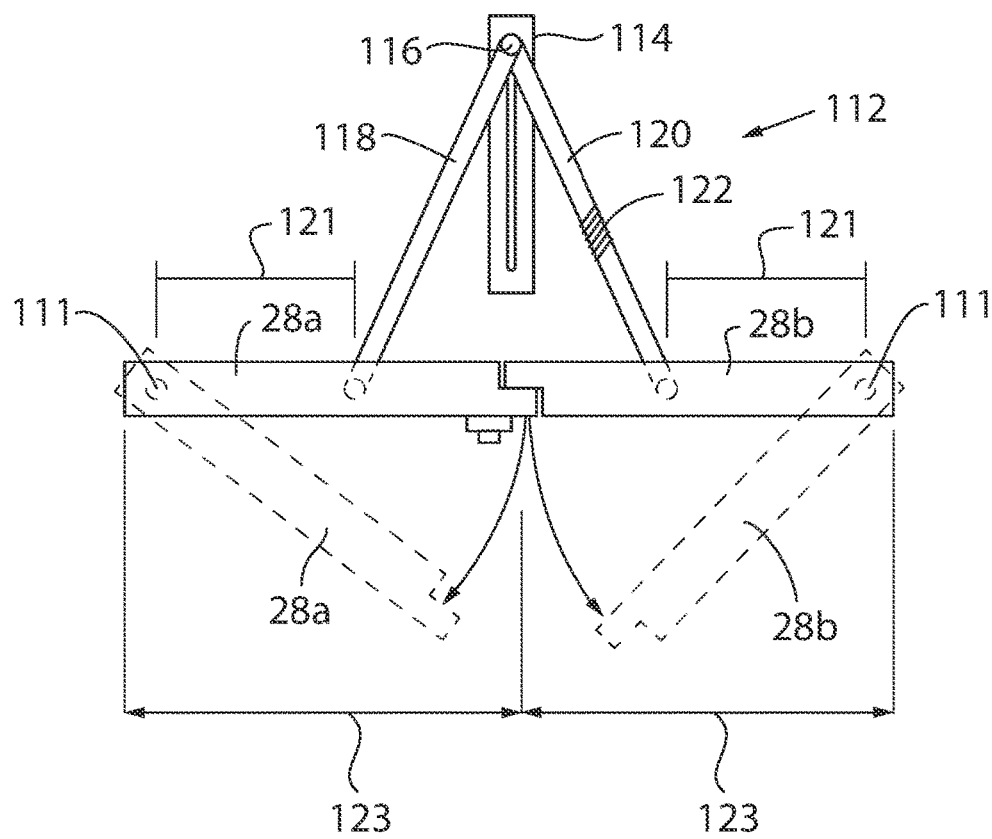
FIG. 10 is a diagrammatic view of the door opening mechanism of FIG. 9 and the doors illustrating a phased closing of the doors.

Referring now to FIGS. 9 and 10, in one embodiment, the oven 10 may have two doors 28a and 28b each providing a rectangular frame of peripheral rails 19 holding a center glass panel 26. The doors 28a and 28b may be hinged about their outer edges along vertical 111 hinge axes providing maximum unobstructed access to the oven opening 18. A handle 29 may be placed on an inner vertical rail of only one door 28a to allow movement of this door 28a directly. Door 28a communicates with an internal mechanism 112 causing both doors 28a and 28b to move together when a single door is moved.

Mechanism 112 provides a slider track 114 extending horizontally along a front to back axis beneath the doors 28, the slider track 114 holding a slider pin 116 to move linearly along the track axis. The slider pin 116 pivotally holds two tie arms 118 and 120 whose remaining ends pivotally attach to lower horizontal rails 19 of each door 28. Motion of door 28a (shown moving to an open configuration illustrated with dotted lines) causes movement of the slider pin 116 forward which moves the tie arm 120 providing corresponding opening motion of the door 28b.

The mechanism 112 provides that the door 28b closes slightly earlier than the door 28a to allow the inner vertical rail 19 of the door 28a to either slightly overlap the adjacent rail 19 of door 28b so that door 28a when locked holds door 28b closed or to allow a similar overlap of gasket structures for sealing the two doors together. This phasing of the closure of the doors 28 may be accomplished through a variety of means including a combination of using different lengths of tie arms 118 and 120, adjustments of the distances 121 between the axes 111, points of attachment between the tie arms 118 and 120 with the doors 28a and 28b, different horizontal widths 123 of doors 28, and the like. Some spring biased resilience represented by spring 122 may be incorporated into the tie arm 120, its attachment points, or the gasketing of the door 28b so that when door 28b closes, it first permits continued motion of the pin 116 rearward for closure of door 28a.

Figure 11:
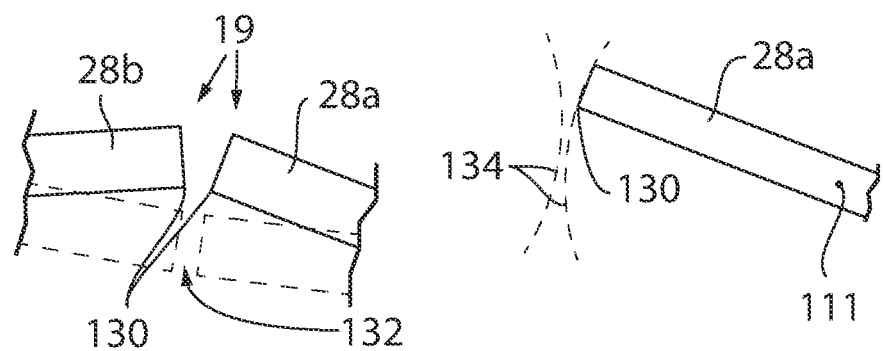
FIG. 11 is a top plan elevational view of the doors as closing showing (to the left) interference between leading edges of the doors which necessitate greater door spacing and non-intersecting door swing trajectories (to the right)
Figure 12:
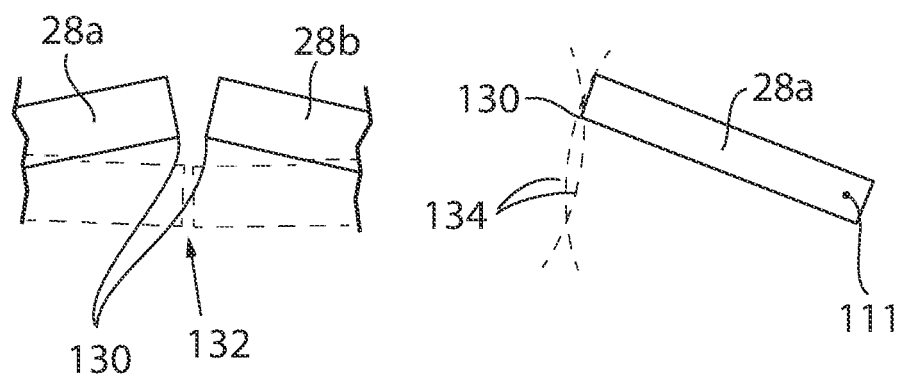
FIG. 12 is a figure similar to that of FIG. 11 showing the phased closing of the doors which allows overlapping of their trajectories without interference for closer sealing.

Referring now to FIGS. 11 and 12, this offsetting or phasing of closing of the doors 28a and 28b also provides for a closer clearance between the adjacent vertical rails 19 of the doors 28a and 28b. For example, when the doors 28 are set too close together as shown in FIG. 11, leading edges 130 of each door 28 must be prevented from colliding. This collision is prevented by preventing trajectories 134 of the opposed edges of each door 28 from overlapping, a requirement that results in a substantial gap 132 between the doors 28 when they are closed.

On the contrary with the offsetting of the doors 28 per the present invention, the leading edge 130 of door 28a is ahead of the leading edge 130 of door 28b allowing a slight overlap of the trajectories 134 allowing closer positioning of the opposed edges of the doors 28 and providing a much narrower gap 132.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:
1. A multi-cavity oven comprising:
    a housing having inner walls defining an oven cavity;
    at least one removable shelf fitting within the oven cavity and providing an upper and lower passageway through the removable shelf communicating respectively with upwardly directed and downwardly directed air jets of the removable shelf, the shelf separating the oven cavity into an upper and lower cooking chamber;
    a first and second air outlet through an inner wall of the oven cavity and communicating with the upper and lower passageways of the removable shelf respectively when the removable shelf is installed within the oven cavity;
    a first and second shutter positioned at the first and second air outlet respectively and movable between an opened state allowing air passage out a respective one of the first and second outlet and a closed state blocking air passage out of the respective one of the first and second outlet; and at least one operator communicating between the removable shelf and the first and second shutter to move the first and second shutter between the closed state and opened state with insertion of the removable shelf into the oven cavity;

wherein the operator is a rearwardly extending finger attached to a rear edge of the at least one removable shelf which the operator presses to press at least one of the first and second shutters inward;

wherein the rearwardly extending finger provides a greater rearward extension on a first side of the rearwardly extending finger and a lesser rearward extension on a second opposite side of the rearwardly extending finger.

2. The multi-cavity oven of claim 1 wherein the first and second shutter each provide a flap hingeably attached over one of the first or second air outlet respectively to swing inward away from the oven cavity and into the first or second air outlet in the opened state and to swing outward toward the oven cavity to block the first and second air outlet in the closed state.

3. The multi-cavity oven of claim 1 wherein respective sleeves having horizontal bores receiving respective hinge pins allow the sleeves to swing about horizontal axes of the hinge pins.

4. The multi-cavity oven of claim 1 further wherein at least one stop surface prevents a swinging outward of the first and second flaps into the oven cavity from the closed state.

5. The multi-cavity oven of claim 1 wherein the removable shelf provides separable upper and lower shelf portions providing the upper passageway or lower passageway respectively where each of the shelf portions provides a finger pressing a respective one of the first and second shutters inward.

6. The multi-cavity oven of claim 1 wherein the first and second air outlets communicate with ductwork behind the inner wall away from the oven cavity and communicate with independent heating elements and wherein the ductwork includes pockets for receiving the first and second shutters flush with a duct wall when the first and second shutters are in the opened state.

7. The multi-cavity oven of claim 1 wherein an inner wall of the housing adjacent to at least one of the first and second shutters provides an access area bounded by perforations, the wall of the access area selectively removable by prying action breaking material between the perforations to remove material of the access area to provide access to the shutter.

8. The multi-cavity oven of claim 7 wherein the inner wall further includes pilot holes outside of the access area for receiving and attaching a patch plate sized to cover the access area once the material of the access area has been removed.

9. The multi-cavity oven of claim 8 wherein the housing provides outer walls spaced from and outside of the inner walls and wherein an outer wall also provides an access area bounded by perforations, the wall of the access area of the outer wall selectively removable by prying action breaking material between the perforations to remove material of the access area of the outer wall to provide access to the access area of the inner wall.

10. The multi-cavity oven of claim 1 wherein the upper and lower passageways separately conduct separate temperatures of airflow without intermixing.

11. A multi-cavity oven comprising:
a housing having inner walls defining an oven cavity;
at least one removable shelf fitting within the oven cavity and providing an upper and lower passageway through the removable shelf communicating respectively with upwardly directed and downwardly directed air jets of the removable shelf, the shelf separating the oven cavity into an upper and lower cooking chamber;
a first and second air outlet through an inner wall of the oven cavity and communicating with the upper and lower passageways of the removable shelf respectively when the removable shelf is installed within the oven cavity;
a first and second shutter positioned at the first and second air outlet respectively and movable between an opened state allowing air passage out a respective one of the first and second outlet and a closed state blocking air passage out of the respective one of the first and second outlet; and
at least one operator communicating between the removable shelf and the first and second shutter to move the first and second shutter between the closed state and opened state with insertion of the removable shelf into the oven cavity;
wherein the operator is a rearwardly extending finger attached to a rear edge of the at least one removable shelf which the operator presses to press at least one of the first and second shutters inward;
wherein at least one shutter may include a tooth extending outwardly from a surface facing the finger to engage the finger.

12. A multi-cavity oven comprising:
a housing having inner walls defining an oven cavity;
at least one removable shelf fitting within the oven cavity and providing an upper and lower passageway through the removable shelf communicating respectively with upwardly directed and downwardly directed air jets of the removable shelf, the shelf separating the oven cavity into an upper and lower cooking chamber;
a first and second air outlet through an inner wall of the oven cavity and communicating with the upper and lower passageways of the removable shelf respectively when the removable shelf is installed within the oven cavity;
a first and second shutter positioned at the first and second air outlet respectively and movable between an opened state allowing air passage out a respective one of the first and second outlet and a closed state blocking air passage out of the respective one of the first and second outlet; and
at least one operator communicating between the removable shelf and the first and second shutter to move the first and second shutter between the closed state and opened state with insertion of the removable shelf into the oven cavity;
wherein the operator is a rearwardly extending finger attached to a rear edge of the at least one removable shelf which the operator presses to press at least one of the first and second shutters inward;
wherein the removable shelf provides separable upper and lower shelf portions providing the upper passageway or lower passageway respectively where each of the shelf portions provides a finger pressing a respective one of the first and second shutters inward;
wherein each finger provides a first portion closest to the air jets of the shelf portion and extends respectively rearward further than a second portion of the finger further from the air jets of the shelf portion so that the upper shelf portion having upwardly facing air jets provides a greater angular swing in a respective shutter than the lower shelf portion having downwardly facing air jets.

\* \* \* \* \*